April 2, 1968 I. DANYLCHUK 3,376,561

MAGNETIC MEMORY SHEET

Filed April 20, 1964 2 Sheets-Sheet 1

INVENTOR
I. DANYLCHUK
BY Herbert M. Shapiro
ATTORNEY

FIG. 2
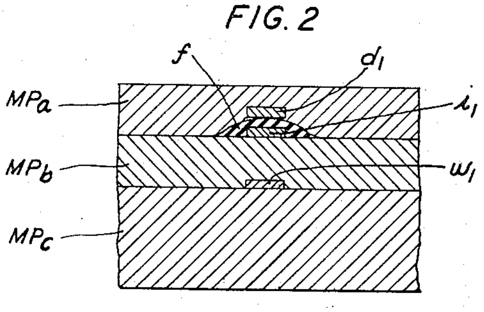
FIG. 3
| | RESET | "1" | "0" | "$i_1$" |
|---|---|---|---|---|
| $MP_a$ | → | → | ← | ← |
| $MP_b$ | → | ← | ← | → |
| $MP_c$ | ←<br>← | →<br>← | →<br>→ | ←<br>→ |
FIG. 4
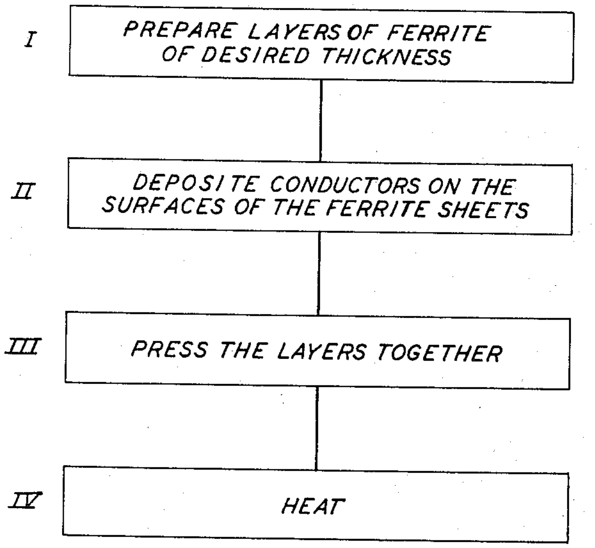

United States Patent Office 3,376,561
Patented Apr. 2, 1968

3,376,561
MAGNETIC MEMORY SHEET

Irynej Danylchuk, Morristown, N.J., assignor to Bell Telephone Laboratories, Incorporated, New York, N.Y., a corporation of New York Filed Apr. 20, 1964, Ser. No. 360,848
3 Claims. (Cl. 340—174)

ABSTRACT OF THE DISCLOSURE

Interaction effects between neighboring bit locations in a magnetic sheet are avoided by forming the sheet in a plurality of layers which separate conductor planes in a manner to define bit locations each oriented generally normal to the plane of the sheet. The layers are chosen of flux limiting thickness so that flux switched in one layer at a selected bit location finds closure only through other layers in the same bit location.

This invention relates to magnetic memories, and, more particularly, to magnetic memories including a plurality of bit locations defined on a single sheet of magnetic material having substantially rectangular hysteresis characteristics.

The formation of bit locations on a single sheet of such magnetic material is accomplished by well known, high speed techniques which lend themselves to miniaturization. For this reason, and others, memories including single sheet memory planes are highly promising from a commercial standpoint. One problem which has limited commercial acceptance of such single sheet memory planes is that flux switched in one bit location may find closure through an adjacent bit location rather than through magnetic paths provided for flux closure purposes within the same bit location. This problem commonly known as an "interaction effect" is most acute in miniaturized memory planes where adjacent bit locations are in close proximity to one another.

The primary reason for interaction effects is that the magnetic material intermediate adjacent bit locations in a magnetic sheet does not provide a discrete flux closure path for each bit location. Various techniques have been proposed for providing discrete paths therethrough. One proposal, for example, is to cut slots between the bit locations, completely isolating them from one another. Such slots, however, are relatively expensive to form, weaken the magnetic structure, and are difficult to bridge by electrical conductors formed, most expediously by well known photo-plating techniques.

An object of this invention is to provide a new and novel single sheet, magnetic memory plane wherein the interaction effect is substantially avoided.

Another object of this invention is to provide a method for realizing such a memory plane.

This invention is based, to a large extent, on the realization that interaction effects can be substantially avoided by reorienting each bit location along an axis normal to the memory plane. In this manner, a precise path through the magnetic material intermediate adjacent bit locations is determined, primarily, by the distance between one of the drive conductors and the surface of the memory plane.

The above and further objects of this invention are realized in one embodiment thereof wherein the digit and word conductors of a word-organized, magnetic memory are located in what may be thought of as spaced-apart conductor planes. The planes of conductors are sandwiched in spaced-apart relationship by what may be thought of as first, second, and third layers of any well known plastic ferrite. Corresponding portions of the conductor planes define thereabout a single bit location. At each bit location of a selected word, flux in first and second directions in stored in the first layer for currents of opposite polarity in the corresponding word and digit conductors, and for a current in the word conductor only, respectively. Read out is provided by driving to one direction the flux in the first layer at each interrogated bit location and detecting, on a word-organized basis, flux switched through the second layer therein. The designations of the various conductors and pulse sources described herein are in keeping with the usual designation in word-organized memories.

Accordingly, a feature of this invention is a single sheet, magnetic memory plane wherein the bit locations therein are oriented along axes normal to the memory plane.

Another feature of this invention is the limitation of the flux closure path, for flux switched at a selected bit location, to a cross-sectional area determined, primarily, by the thickness of the first layer, or, in other words, the distance between the digit conductor plane and the surface of the memory plane.

Another feature of this invention is the formation of a rigid memory plane from a plurality of discrete layers including conductors thereon.

The above and further objects and features of this invention will be understood more fully in connection with the following discussion rendered in conjunction with the accompanying drawing wherein:

FIG. 2 is a cross-sectional view of a representative bit location of the memory of FIG. 1;

FIG. 3 is a chart of the various flux configurations to which the representative bit location of the memory of FIG. 1 is switched during operation in accordance with this invention; and, FIG. 4 is a flow chart showing the steps for fabricating the memory of FIG. 1.

Figure 1:
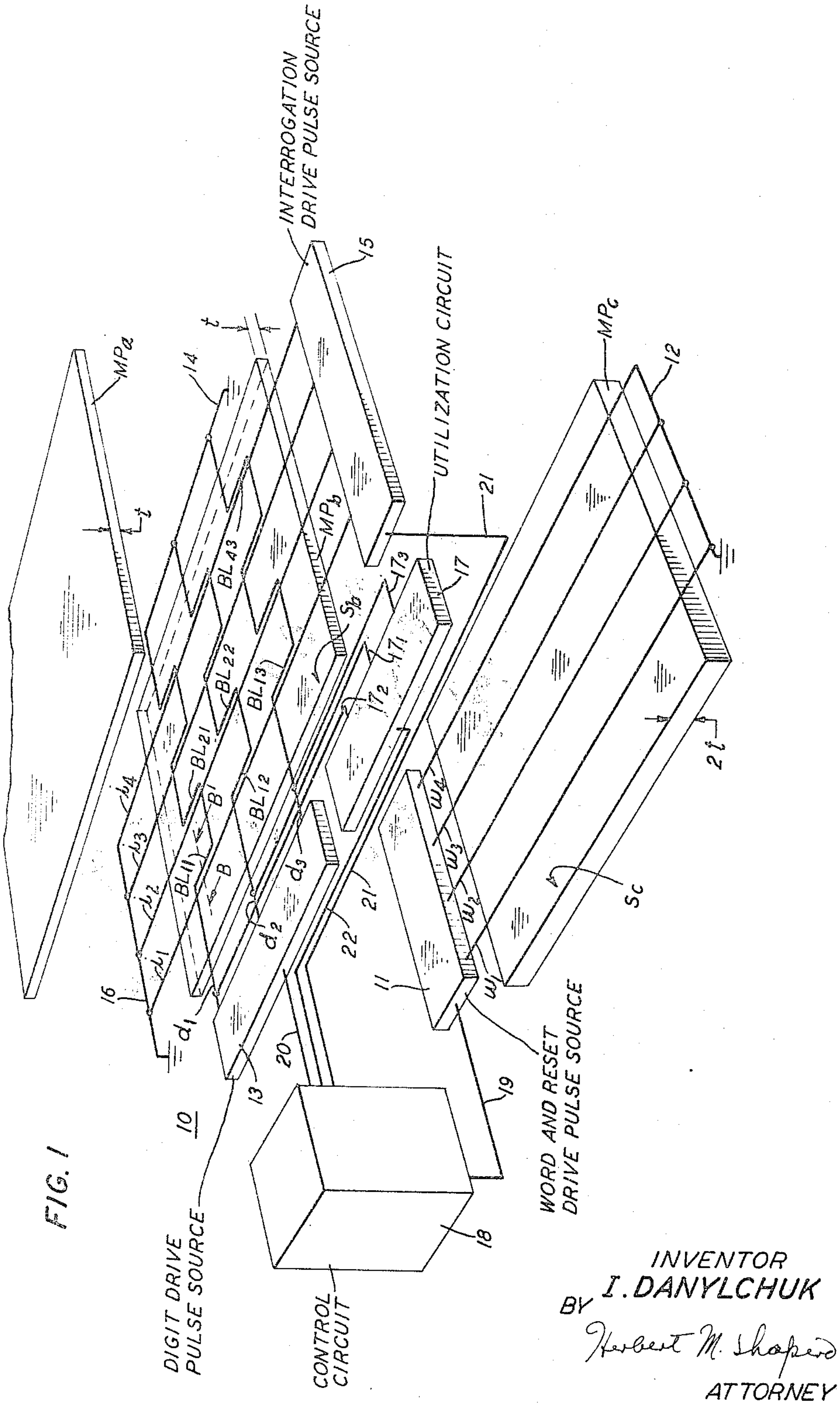
FIG. 1 is an exploded plan view of a word-organized memory in accordance with this invention.

It is to be understood that the figures are not necessarily to scale, certain exaggerations having been made therein for the purpose of illustration.

In the ensuing discussion of the structure of a memory in accordance with this invention, the memory plane therein is described as having distinct layers. It is to be understood at the outset that this particular mode of description is selected, primarily, for illustrative purposes, and, also, to emphasize the connection between the structure and the method described for its fabrication. The memory plane, however, is an integral structure in its final state, a fact which is made abundantly clear in the discussion hereinafter.

FIG. 1 shows a word-organized memory 10 including a memory plane which, for illustrative purposes, is shown divided into first, second, and third layers designated $MP_a$, $MP_b$, and $MP_c$, respectively. The layers $MP_a$ and $MP_b$ have equal thicknesses $t$ which is half the thickness of the layer $MP_c$. A plurality of word conductors $w_1$, $w_2$, $w_3$, and $w_4$ are positioned on the surface $S_c$ of layer $MP_c$ and connected between word and reset drive pulse source 11 and ground bus 12. Similarly, a plurality of digit conductors $d_1$, $d_2$, and $d_3$ are positioned on the surfaces $S_b$ of layer $MP_b$. Each digit conductor is aligned generally orthogonal to the word conductors but changes direction to overlie a small segment of each word conductor. The portions of the conductors $d_1$, $d_2$, and $d_3$ which overlie the word conductors define the bit locations of the memory and are designated, accordingly, $BL_{11}$, $BL_{12}$, $BL_{13}$, $BL_{23}$ . . . $BL_{33}$ . . . and $BL_{43}$. Twelve bit locations (four words, three bits each) are illustrated. A fewer or greater number of bit locations can be used in accordance with this invention, however. The digit conductors are connected between digit drive pulse source 13 and ground bus 14. The digit conductors, further, are connected to utilization circuit 17 by means of conductors $\mathbf{17_1}$, $\mathbf{17_2}$, and $\mathbf{17_3}$, respectively; suitable isolation means (not shown) is provided between each of the last mentioned conductors and the corresponding digit conductor. A plurality of interrogation conductors $i_1$, $i_2$, $i_3$, and $i_4$ are positioned on surface $S_b$ oriented in the direction of the word conductors and connected between an interrogation drive pulse source 15 and ground bus 16. Word and reset drive pulse source 11, digit drive pulse source 13, interrogation pulse source 15, and utilization circuit 17 are connected to control circuit 18 by means of conductors 19, 20, 21 and 22, respectively.

A cross-sectional view of a representative bit location $BL_{11}$ is shown in FIG. 2. The cross section is taken along the broken line B–B′ as indicated in FIG. 1. This cross section illustrates the separation of the digit and interrogate conductors by electrically insulating material, typically deposited ferrite-filled varnish. Such insulation is necessary, for example, when more than one plurality of conductors is positioned in such close proximity on the surface of a single layer in accordance with this invention. The figure also serves as a visual aid in understading the orientation of the flux patterns shown in FIG. 3 for the various magnetic conditions to which a bit location is switched in accordance with this invention.

The foregoing memory is described as a word-organized memory. Accordingly, the operation thereof will be described in terms of a representative word 101 written into and read out of the bit locations $BL_{11}$, $BL_{12}$, and $BL_{13}$. Since these bit locations store information alike, FIG. 2 serves as a representative cross section of such a bit location.

Initially, a large amplitude, negative reset pulse is applied to the word conductor $w_1$ for driving clockwise thereabout the flux in the bit locations $BL_{11}$, $BL_{12}$, and $BL_{13}$. The resulting flux condition is shown in FIG. 3 in the column labeled "reset." In this connection, a negative pulse is one in which current flows in the direction of the drive pulse source as viewed in FIG. 1. The reset pulse is applied by word and reset drive pulse source 11 under the control of control circuit 18. The various drive pulse sources herein described may be any pulse sources capable of delivering the pulses required in accordance with this invention. Similarly, control circuit 18 may be any control circuit capable of controlling the various pulse sources in accordance with this invention.

A binary "1" is stored in the representative bit location $BL_{11}$ in accordance with this invention by applying a negative digit pulse and a positive word pulse coincidently to digit conductor $d_1$ and word conductor $w_1$, respectively. A positive pulse is one in which current flows from the drive pulse source as viewed in FIG. 1. These pulses are applied by simultaneous activation of drive pulse sources 13 and 11, respectively, under the control of control circuit 18. The digit pulse acts to inhibit the switching of the flux in layer $MP_a$ at bit location $BL_{11}$. In this connection, the digit pulse is of an amplitude sufficient to inhibit flux switching in the bit location but insufficient to switch flux in the corresponding bit location of the adjacent word. The resulting flux condition at the bit location is shown in FIG. 3 in the column labeled "1".

A binary "0" is stored in the representative bit location $BL_{11}$ in accordance with this invention by applying a positive word pulse to word conductor $w_1$. This pulse is applied by means of word and reset drive pulse source 11 under the control of control circuit 18 and effects flux reversal to a counterclockwise direction in the layers at the bit location $BL_{11}$. The resulting flux condition is shown in FIG. 3 in the column labeled "0."

For writing the word 101, in accordance with the assumed illustrative operation, a positive pulse is applied to word conductor $w_1$ and negative pulses are applied to digit conductors $d_1$ and $d_3$. The resulting flux conditions in bit locations $BL_{11}$ and $BL_{13}$ are as shown in FIG. 3 in the column labeled "1." No pulse is applied to digit conductor $d_2$ at this time. The resulting flux condition in bit location $BL_{12}$ is as shown in FIG. 3 in the column labeled "0." It is important to note that, for the assumed operation, a binary "1" corresponds to flux directed to the right in layer $MP_a$ and to the left in layer $MP_b$ at the selected bit location. In contradistinction, a binary "0" corresponds to flux directed to the left in both layers $MP_a$ and $MP_b$. These directions are as viewed in FIG. 3.

The assumed illustrative word is read out by applying a negative, limited-amplitude, interrogation pulse to the interrogation conductor $i_1$. In this connection, a limited-amplitude pulse is a pulse which has an amplitude insufficient to cause switching flux in layer $MP_a$ to close through layer $MP_c$. Such a pulse is provided by means of interrogation drive pulse source 15 under the control of control circuit 18. The interrogation (also called the read) pulse drives flux in layer $MP_a$ to the left as viewed in FIG. 3, flux closure necessarily being through layer $MP_b$. As can be seen in FIG. 3, the affected bit locations including a binary "0" have the flux in the layer $MP_a$ already directed to the left and cannot switch in response to the interrogation pulse. In accordance with the assumed illustrative operation, bit location $BL_{12}$ has a binary "0" stored there. Bit locations $BL_{11}$ and $BL_{13}$, in accordance with the assumed illustrative operation, have binary "1's" stored. FIG. 3 shows that flux in layer $MP_a$ at bit locations including binary "1's" is directed to the right. Accordingly, the flux in each of these bit locations switches in response to the interrogation pulse, flux closure being via the layer $MP_b$ at each bit location. The flux condition after interrogation is shown in FIG. 3 in the column labeled "$i_1$." The switching flux at each bit location, including a binary "1," induces a negative pulse in the corresponding digit conductor. Accordingly, in response to the interrogation pulse, an output pulse is induced in digit conductors *d*1 and *d*3, and conducted via conductors $\mathbf{17_1}$ and $\mathbf{17_3}$, respectively, to utilization circuit 17. Utilization circuit 17 may be any circuit capable of utilizing a parallel output in accordance with this invention.

At this juncture in the operation, the various bit locations are reset as described hereinbefore preparatory to storing additional information. Alternatively, a positive, limited-amplitude interrogation pulse is applied to the interrogation conductor $i_1$ for reestablishing the original information, permitting a nondestructive mode of operation. That such a nondestructive mode of operation can be realized may be appreciated with reference to FIG. 3 in the column labeled "$i_1$." The column shows the flux condition, after interrogation, in a bit location including a binary "1." Flux can be seen to be directed to the left in layer $MP_a$ and to the right layer $MP_b$ as viewed in the figure. This is consistent with the description of the interrogation (or read out) hereinabove. A positive, limited-amplitude, interrogation pulse can be seen to reestablish the "1" condition as shown in FIG. 3. The flux in the bit location including a binary "0" remains unchanged. The flux patterns of FIG. 3 are realized for the adjacent word comprising bit locations $BL_{21}$, $BL_2$, and $BL_3$ in the manner described except that a positive digit pulse is applied coincidently with the word pulse for storing a "1." It is to be understood that the digit drive pulse source need not necessarily provide pulses of opposite polarity as described. Alternatively, the sense of every other word conductor may be reversed.

Information is stored in the layers $MP_a$ and $MP_b$ at a bit location, in accordance with this invention, only in response to changes in flux in the layers $MP_c$ at that same bit location. The described relative thicknesses of the layers, then, is to provide requisite flux closure for flux changes in layer $MP_c$. Because of this flux interaction, each bit location comprises all three layers at that portion of the memory plane, the various flux paths therein, and the corresponding aligned portions of the digit, and the word and interrogation conductors. The orientation of each bit location, thus, may be seen to be along an axis normal to the memory plane.

The amount of flux which can be switched at a given bit location for writing and reading information is limited by the minimum cross-sectional area of the first layer there. The cross-sectional area is determined at a bit location by the thickness of the first layer and the length of the portion of the digit conductor which overlies the word conductor. In this context, the operation of a bit location, in accordance with this invention, is seen to be consistent with the operation of the well known two-hole transfluxor. It may be appreciated by one skilled in the art that various other modes of operation, consistent with conventional transfluxor operation, are realizable in accordance with this invention. Furthermore, additional layers of magnetic material with corresponding or different relative thicknesses and additional conductors thereon permit operation consistent with conventional multiapertured elements.

A memory plane in accordance with this invention may be fabricated by forming the three layers of plastic ferrite of required relative thicknesses. These layers may be formed, for example, by the "doctor blade technique" or any well known plating or deposition technique. This step of the method is represented by block I of the flow diagram of FIG. 4. Next, the word conductors are deposited on one layer and the digit and interrogation conductors are deposited sequentially on another layer. Each set of conductors, accordingly, may be thought of as lying in a plane. As stated hereinbefore, when more than one set of conductors is deposited on a single layer, as shown in FIG. 1, it is necessary to electrically insulate them. This is accomplished by depositing a thin layer (approximately 0.05 mil thick) of ferrite-filled varnish over the first set of conductors prior to depositing the second set thereover. The conductors themselves are deposited, for example, by well known photo-deposition techniques, silk screening techniques or any other selective plating technique, and are of materials such as silver-palladium, and silver-platinum alloys, which are solid at the temperatures of the heating step described hereinafter. This step is represented by block II of the flow diagram of FIG. 4. The several layers with the conductors affixed thereto are pressed together and heated, for example, under a pressure of 500 to 1000 pounds per square inch at about 1230 degrees centigrade for about ten hours until a rigid, sintered structure is formed .The steps of pressing and heating are represented by blocks III and IV of the flow diagram of FIG. 4. The process as herein described is consistent with the process described in the RCA Review, December 1963, page 705 et seq., in an article by R. Shahbender et al., entitled "Laminated Ferrite Memory." The plastic ferrite employed may be any desired ferrite powder in compatible organic binders as is well known. Typically, a magnesium, manganese, zinc ferrite having the composition $Fe_2O_3$—39.5%, MgO—20%, MnO—23.1% and ZnO—17.4% (by weight) is employed. Such plastic ferrites are well known to be isotropic and, as might be expected from the above description of the fabrication, results in an isotropic memory plane. Memory planes less than 5 mils thick can be prepared in this manner; individual layers may be fabricated with thicknesses on the order of thousands of Angstrom units. In a typical embodiment, however, layers $MP_a$ and $MP_b$ have initial thicknesses of about 2.5 mils and layer $MP_c$ has a thickness of about 5 mils. Sintering effects about a 20 percent shrinkage in thickness. Such control over the thickness of the several layers permits the flux closure paths within each bit location to be much more closely spaced than possible flux closure paths between two bit locations. As long as adjacent bit locations are spaced apart a distance at least twice the thickness of the layer $MP_a$, a prescribed path for flux closure is provided therebetween and the interaction effect is avoided. For example, word and digit conductor spacings of less than 10 mils are achieved in accordance with this invention; a bit density of more than $10^4/in.^2$ is, thus, provided.

What have been described here are considered to be only illustrative embodiments according to the principles of this invention, and it is to be understood that numerous other arrangements may be devised by one skilled in the art without departing from the spirit and scope thereof.

What is claimed is:

1. A magnetic memory comprising $n$ conductor planes, where $n$ is any integer greater than 1, each of said conductor planes including at least one plurality of conductors, said conductor planes being sandwiched in spaced-apart relationship by $n+1$ contiguous layers of isotropic plastic ferrite, corresponding portions of said plurality of conductors in said conductor planes defining in the ferrite layers thereabout a single bit location, said ferrite layers being characterized in that driven ones of said layers have cross sections at each bit location limiting the amount of flux switched in each in response to the selected energization of different combinations of said plurality of conductors in said conductor planes, and a nondriven one of said layers has at each bit location a cross section at least equal to the total cross sections of said driven layers for providing flux closure for all flux so switched.

2. A magnetic memory in accordance with claim 1 wherein $n=2$.

3. A magnetic memory in accordance with claim 2 including three layers of ferrite wherein the thicknesses of two of the layers are equal and the thickness of the third layer is twice that of either of the two layers.

References Cited

UNITED STATES PATENTS

| | | | |
|---|---|---|---|
| 3,121,217 | 2/1964 | Seeber et al. | 340—174 |
| 3,149,314 | 9/1964 | King | 340—174 |
| 3,259,888 | 7/1966 | Cornely | 340—174 |
| 3,312,961 | 4/1967 | Rajchman | 340—174 |

BERNARD KONICK, *Primary Examiner.*

STANLEY, URYNOWICZ, *Examiner.*